United States Patent
Cook et al.

(10) Patent No.: US 8,594,738 B2
(45) Date of Patent: Nov. 26, 2013

(54) SYSTEM, METHOD AND APPARATUS FOR AUTOMATIC LOCATION-BASED SILENCING OF WIRELESS TRANSCEIVERS

(75) Inventors: Charles Cook, Louisville, CO (US); Thomas Cho, Parker, CO (US)

(73) Assignee: Qwest Communications International Inc., Denver, CO (US)

( * ) Notice: Subject to any disclaimer, the term of this patent is extended or adjusted under 35 U.S.C. 154(b) by 401 days.

(21) Appl. No.: 12/552,121

(22) Filed: Sep. 1, 2009

(65) Prior Publication Data
US 2011/0053572 A1 Mar. 3, 2011

(51) Int. Cl.
*H04M 1/00* (2006.01)

(52) U.S. Cl.
USPC ............... 455/565; 455/404.2; 455/404.1; 455/415

(58) Field of Classification Search
USPC ............ 455/456.1–457, 404.2, 404.1, 414.1, 455/415, 417–422.1, 550.1, 565; 340/539.13, 988–996
See application file for complete search history.

(56) References Cited

U.S. PATENT DOCUMENTS

| | | | |
|---|---|---|---|
| 5,056,107 A | 10/1991 | Johnson et al. | |
| 5,451,938 A | 9/1995 | Brennan, Jr. | |
| 5,553,094 A | 9/1996 | Johnson et al. | |
| 5,586,050 A | 12/1996 | Makel et al. | |
| 5,673,252 A | 9/1997 | Johnson et al. | |
| 6,172,616 B1 | 1/2001 | Johnson et al. | |
| 6,373,399 B1 | 4/2002 | Johnson et al. | |
| 6,396,399 B1 | 5/2002 | Dunlap | |
| 6,424,251 B1 | 7/2002 | Byrne | |
| 6,453,164 B1 | 9/2002 | Fuller et al. | |
| 6,819,098 B2 | 11/2004 | Villicana et al. | |
| 6,907,254 B1 * | 6/2005 | Westfield | 455/456.4 |
| 6,937,868 B2 * | 8/2005 | Himmel et al. | 455/456.4 |
| 7,027,579 B1 | 4/2006 | McDonald et al. | |
| 7,142,894 B2 | 11/2006 | Ichikawa et al. | |
| 7,194,273 B2 * | 3/2007 | Vaudreuil | 455/456.3 |
| 7,231,219 B2 | 6/2007 | Curtis et al. | |
| 7,734,315 B2 * | 6/2010 | Rathus et al. | 455/569.2 |
| 7,873,351 B2 * | 1/2011 | Yahagi | 455/411 |
| 8,116,723 B2 * | 2/2012 | Kaltsukis | 455/404.2 |
| 2004/0004555 A1 | 1/2004 | Martin | |
| 2004/0058718 A1 * | 3/2004 | Yu | 455/567 |
| 2004/0268215 A1 | 12/2004 | Trossen et al. | |
| 2005/0162283 A1 | 7/2005 | Salazar Cardozo | |

(Continued)

OTHER PUBLICATIONS

U.S. Appl. No. 12/552,111; Non Final Office Action dated Sep. 29, 2011; 16 pages.
U.S. Appl. No. 12/552,111; Notice of Publication dated Mar. 3, 2011; 1 page.
US 7,493,113, Feb. 2009, Arend et al. (withdrawn).
U.S. Appl. No. 12/552,111; Final Office Action dated Jan. 18, 2012; 16 pages.

(Continued)

*Primary Examiner* — Patrick Edouard
*Assistant Examiner* — Ronald Eisner
(74) *Attorney, Agent, or Firm* — Swanson & Bratschun, L.L.C.

(57) ABSTRACT

A wireless telecommunication system that automatically enforces a quiet mode of operation for a wireless handset comprises a cellular telecommunication network, and a wireless handset configured to transmit voice and data information to, and configured to receive voice and data information from the cellular telecommunication network. The wireless handset comprises a quiet mode controller configured to disable the wireless handset from issuing the audible notification when the wireless handset is in a designated quiet zone location.

23 Claims, 6 Drawing Sheets

(56) References Cited

U.S. PATENT DOCUMENTS

| | | | |
|---|---|---|---|
| 2006/0128375 A1* | 6/2006 | Wessel van Rooyen | 455/426.1 |
| 2007/0254633 A1 | 11/2007 | Mathew et al. | |
| 2008/0089503 A1 | 4/2008 | Crockett et al. | |
| 2008/0101552 A1* | 5/2008 | Khan et al. | 379/45 |
| 2008/0254776 A1 | 10/2008 | Ma | |
| 2008/0274723 A1 | 11/2008 | Hook et al. | |
| 2009/0117919 A1* | 5/2009 | Hershenson | 455/456.4 |
| 2010/0093332 A1 | 4/2010 | Chen | |
| 2010/0159943 A1* | 6/2010 | Salmon | 455/456.1 |
| 2010/0304719 A1 | 12/2010 | Deep | |

OTHER PUBLICATIONS

U.S. Appl. No. 12/552,111; Non-Final Rejection dates May 1, 2012; 14 pages.

U.S. Appl. No. 12/491,117; Non-Final Rejection dated Jun. 8, 2012; 34 pages.

U.S. Appl. No. 12/552,11; Final Rejection dated Aug. 14, 2012; 24 pages.

\* cited by examiner

SYSTEM, METHOD AND APPARATUS FOR AUTOMATIC LOCATION-BASED SILENCING OF WIRELESS TRANSCEIVERS

RELATED APPLICATION

This application is related to U.S. patent application Ser. No. 12/552,111, filed on Sep. 1, 2009, and titled "SYSTEM, METHOD AND APPARATUS FOR AUTOMATIC SCHEDULE-BASED SILENCING OF WIRELESS TRANSCEIVERS," which is herein incorporated by reference in its entirety.

FIELD

The present disclosure relates generally to wireless transceivers, such as cellular telephones. In particular, but not by way of limitation, the present disclosure relates to systems, methods and apparatuses for automatically transitioning into and out of a quiet mode of operation of a wireless transceiver when the transceiver is in a location where the quiet mode of operation is desirable or mandatory.

BACKGROUND

The use of wireless communication devices, such as cellular and personal communications system (PCS) telephones, pagers, personal digital assistants (PDAs), smartphones and the like has become ubiquitous. Such devices offer many advantages including the ability to establish communication at almost any location and at almost any time. Thus, wireless users can talk with friends and colleagues, receive updates on the weather or the stock market, send and receive e-mail, receive audible alarms for important events, and many other useful activities.

While wireless communication brings many benefits, there are occasionally some drawbacks. The ringing of a wireless telephone is an unwanted event at public settings such as performances, meetings, movies, plays, lectures, concerts, religious services and the like. Portable wireless devices may create a distraction to learning in schools. Operation of a wireless handset may create a hazardous distraction to vehicle operators. Operation of various wireless devices may also interfere with the safe operation of commercial aircraft and life-supporting medical equipment. Often users of wireless handsets forget to turn off, silence or otherwise modify the notification capabilities of their wireless handsets when in circumstances where such actions are appropriate or mandated by law.

SUMMARY

Illustrative embodiments are shown in the drawings and summarized below. These and other embodiments are more fully described in the Detailed Description section. It is to be understood, however, that there is no intention to limit the scope of the claims to the embodiments and examples described in this Summary or in the Detailed Description. One skilled in the art can recognize that there are numerous modifications, equivalents, and alternative constructions that fall within the spirit and scope of this disclosure as expressed in the claims.

One embodiment includes a wireless telecommunication system that automatically enforces a quiet mode of operation. The system comprises a cellular telecommunication network, and a wireless handset configured to transmit voice and data information to, and configured to receive voice and data information from the cellular telecommunication network. The wireless handset is configured to issue an audible notification upon the occurrence of one or more types of events. The wireless handset further comprises a quiet mode controller configured to disable the wireless handset from issuing the audible notification when the wireless handset is located in a designated quiet location.

Another embodiment includes a wireless telecommunication system adapted to implement a quiet mode of operation. The wireless telecommunication system comprises a cellular telecommunication network, a quiet zone signal transmitter configured to issue a quiet zone signal receivable in a physical environment of a quiet zone, and a wireless handset configured to transmit voice and data information to, and configured to receive voice and data information from, the cellular telecommunication network. The wireless handset is also configured to receive the quiet zone signal when the wireless handset is located within the physical environment of the quiet zone. The wireless handset also comprises a quiet mode controller configured to set the wireless handset to operate in a quiet mode when the wireless handset receives the quiet zone signal.

Another embodiment includes a computer-implemented method for automatically adjusting an operational mode of a wireless handset. The method comprises designating a quiet zone location in three-dimensional space, transmitting a quiet zone signal to demark the quiet zone, and defining an action for the wireless handset to automatically initiate when the wireless handset receives the transmitted quiet zone signal.

The above-described objects and features as well as other objects, features, and advantages of the present disclosure are readily apparent from the following detailed description when taken in connection with the accompanying drawings.

BRIEF DESCRIPTION OF THE DRAWINGS

Various objects and advantages of the present disclosure are apparent and more readily appreciated by reference to the following Detailed Description and to the appended claims when taken in conjunction with the accompanying Drawings, wherein:

DETAILED DESCRIPTION

Figure 1:
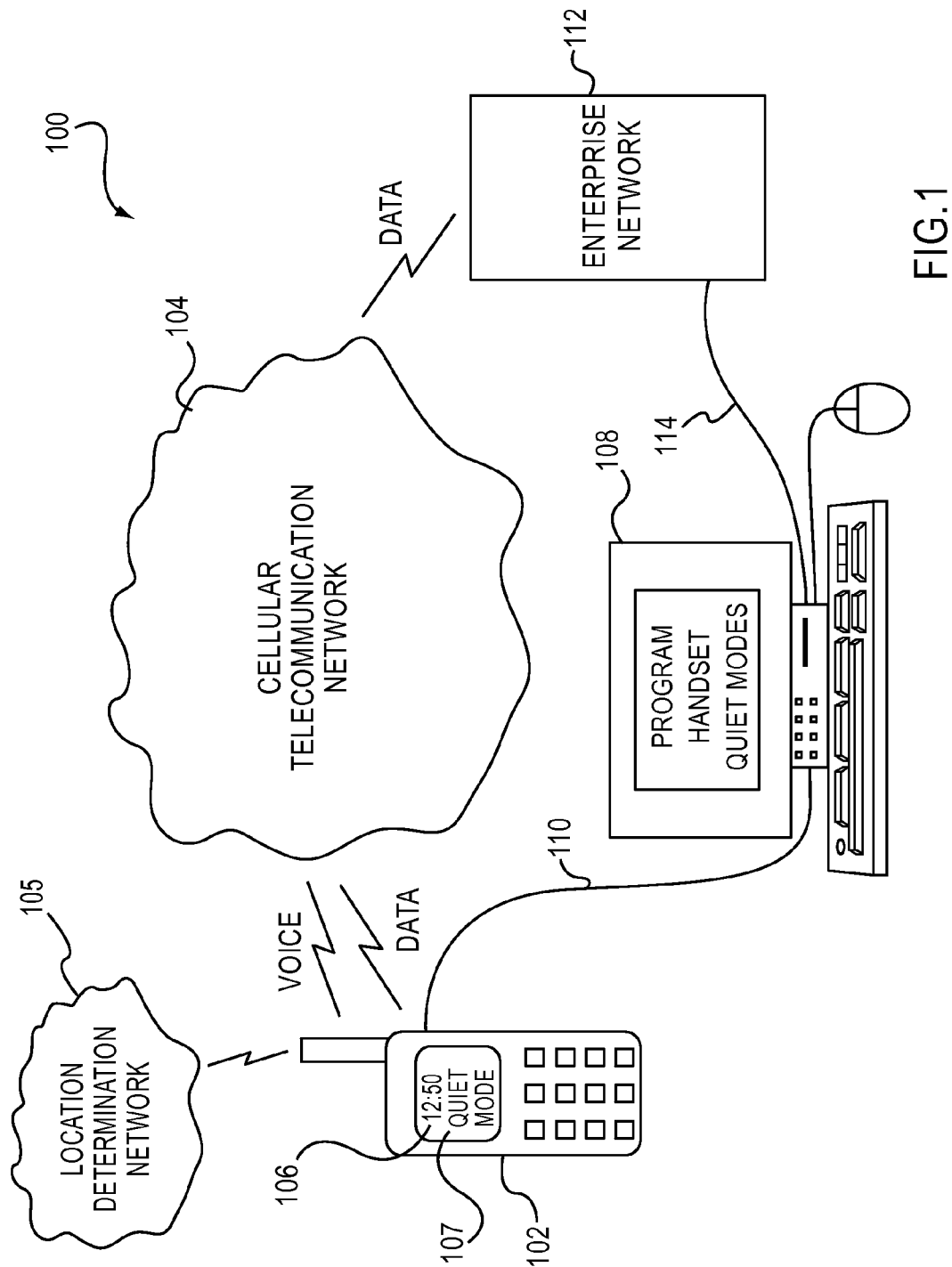
FIG. 1 is an architectural diagram illustrating a wireless telecommunications silencing system.

Reference is now directed to the drawings, where like or similar elements are designated with identical or corresponding reference numerals throughout the several views.

Referring to FIG. 1, an architectural diagram illustrating a wireless telecommunications silencing system 100 according to one embodiment is shown. A wireless transceiver (referred to herein as "cell phone," "smartphone," "handheld device" or "wireless handset") 102 communicates wirelessly with a cellular telecommunication network 104 that is capable of transmitting voice and data information. The wireless transceiver 102 also communicates with a location determination network 105, such as, for example, the NAVSTAR global positioning system (GPS) network, that is capable of communicating to the cell phone 102 the cell phone's current geographical location. The cell phone 102 includes, among other features, a clock 106 that keeps track of, and indicates the date and time of day on a display screen 107. A computer 108 is connected to the cell phone 102 by, for example, a standard universal serial bus (USB) cable 110. The computer 108 is also connected to an enterprise network 112 by, for example, a standard Ethernet™ connection 114. The enterprise network 112 is configured to transmit data to the cellular telecommunication network 104.

One skilled in the art will readily appreciate that the illustrated arrangement of the above-described system components, as well as the means by which those components interconnect, are provided as an illustrative example. Accordingly, the components can be configured differently than as depicted in an actual implementation, and the components can be connected in a variety of ways without changing the basic operation of the system 100. For example, the cell phone 102 may be connected to the computer 108 wirelessly or by infrared communication protocol. Similarly, the computer 108 may be connected to the enterprise network 112 by wireless communications or fiber optic connection. Computer 108 may include one or more of the components described in conjunction with FIG. 5.

The cell phone 102 has the ability to be programmed to operate in different modes for signaling to the user that a phone call is being received or that another type of event has occurred, such as, for example, the arrival of a new e-mail, voice mail or text message or that the time for a scheduled event has arrived. Often the mode of operation for such a condition, especially for signaling an incoming phone call, is to provide an audible sound, such as a ring tone, to alert the user of the cell phone 102. Other modes of operating upon receipt of an incoming call include without limitation a vibrate mode, where the cell phone 102 vibrates to signal to the user (primarily through the sense of feel) that a call has been received, or another event has occurred, without disturbing others that are present, and a visual-only mode, where the user is not notified by audible or vibratory means that the call has been received; instead notification of an incoming call is provided only on the display screen 107 of the cell phone 102.

A more personalized mode of signaling a user of a cell phone 102 that a call is received includes the ability to program a specific ring tone or action when a particular individual calls or when a defined class of callers call. For example, the cell phone 102 may be programmed to play a unique ring tone when it receives a call from members of the user's family or from the school at which the user's children attend.

Users of cell phones 102 often use electronic calendar programs to manage their day-to-day schedules. Some such calendar programs operate directly on the cell phone 102, while other calendar programs operate on the computer 108; such calendar programs are configured to synchronize with calendar functions of certain cell phones 102. For example, Microsoft™ Corporation offers a personal information management software program called Outlook™ that permits a user to, among other things, manage his or her schedule on a standard personal computer 108. Although often used mainly as an e-mail application, Outlook™ also includes a calendar, task manager, contact manager, note taking, a journal and web browsing. Outlook™ is also able to synchronize with certain cell phones 102, often referred to as "smartphones," such as for example, the line of cell phones 102 offered by Research In Motion, Ltd. under the brand name BlackBerry™.

An important function of the smartphone type of cell phone 102 is its ability to synchronize data with a personal computer 108. This allows up-to-date contact information stored in a software program such as Microsoft Outlook™ or ACT!™ to update a corresponding database on the cell phone 102. Such data synchronization ensures that the cell phone 102 has an accurate list of contacts, calendar appointments and e-mail, allowing users to access the same information on the cell phone 102 as is on the host computer. In the embodiment of FIG. 1, synchronization of data between the cell phone 102 and personal computer 108 transpires by way of a direct universal serial bus (USB) cable 110, although wireless or other network-based synchronization is also contemplated.

Synchronization of data prevents loss of information stored on the cell phone 102 in case the cell phone 102 is lost, stolen, or destroyed. Another advantage is that data is usually input more quickly and easily on a computer 108, since text input via a touch screen or small keyboard is not optimal. Transferring data to a cell phone 102 via the computer 108 is therefore quicker than having to manually input all data on the wireless handset 102.

Synchronization is often accomplished through synchronization software provided with the wireless handset 102, such as for example HotSync Manager™, which comes with Palm OS™ brand handhelds 102, Microsoft ActiveSync™ for older versions of Windows™ or Windows Mobile Device Center™ on Windows Vista™, which comes with Windows Mobile™ cell phones 102.

These programs allow the cell phone 102 to be synchronized with a personal information manager. This personal information manager may be an outside program or a proprietary program. For example, the BlackBerry™ brand smartphone 102 comes with the Desktop Manager™ program that can synchronize to both Microsoft Outlook™ and ACT!™. Other cell phones 102 come only with their own proprietary software. For example, some early Palm OS™ smartphones 102 came only with Palm Desktop™ while later Palm smartphones 102 such as the Treo™ 650 have the built-in ability to sync to Palm Desktop™ or Microsoft Outlook™, while Microsoft's ActiveSync™ and Windows Mobile Device Center™ only synchronize with Microsoft Outlook™ or a Microsoft Exchange™ server.

Third-party synchronization software is also available for many cell phones 102 from companies like Intellisync™ and CompanionLink™. This software synchronizes cell phones 102 to other personal information managers which are not supported by the manufacturers, such as GoldMine™ and Lotus Notes™.

If the user's computer is connected to an enterprise network 112, then it is also possible for the user's computer 108 to synchronize data, such as calendar information, with the user's cell phone 102 by transmission of data from the enterprise server 112 to the cell phone 102 over the cellular telecommunication network 104. For example, the Blackberry™ brand of products and services offer BlackBerry™ handhelds 102 that are integrated into an organization's deployed personal information management system through a software package called "BlackBerry Enterprise Server"™ (BES). Versions of BES are available for Microsoft Exchange™, Lotus Domino™ and Novell GroupWise™. While individual users may be able to use a wireless provider's synchronization services without having to install BES themselves, organizations with multiple users usually run BES on their own network. Additionally, some third-party companies provide hosted BES solutions as well. Thus, users of cell phones 102 are able to easily synchronize, store and update their personal information on their cell phones 102, including their calendar information.

Figure 2:
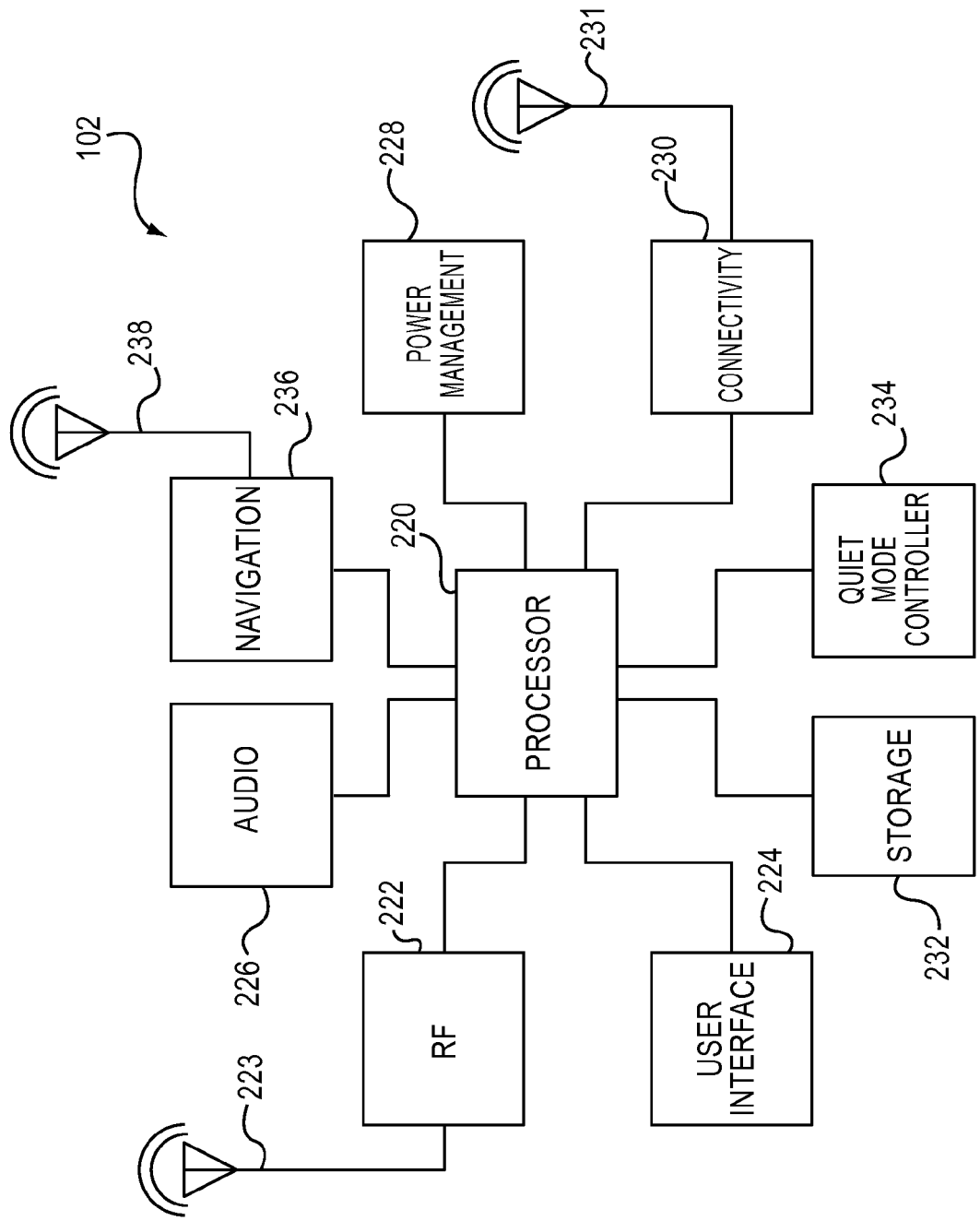
FIG. 2 is a block diagram illustrating the functional components of a wireless handset according to one aspect of the inventions described herein.

Referring to FIG. 2, disclosed is a functional block diagram of a typical cell phone 102 as depicted in FIG. 1. At the heart of the cell phone 102 is a processor 220 that controls the overall operation of the cell phone 102. Coupled to the processor 220 is one or more components 222 configured to transmit and to receive radio frequency (RF) signals according to one or more protocols such as GSM, CDMA and WCDMA as well as a user identification and authentication device, such as a SIM card. One or more antennas 223 are coupled to the RF components 222 to transmit and to receive RF signals.

A user interface 224 is also coupled to the processor 220. The user interface typically comprises a display, such as a liquid crystal display, a keypad and a controller to manage the display.

An audio device 226 is coupled to the processor 220. The audio device typically comprises a speaker, an earpiece jack, a headset jack and/or an audio controller.

Other components coupled to the processor 220 comprise a power management functional block 228 of the cell phone 102 depicted in FIG. 2. The power management block 228 typically comprises one or more of a rechargeable battery, such as a lithium-ion battery, a power management component to manage battery power, and a Wi-Fi™ power management controller.

The connectivity block 230, coupled to the processor 220, comprises a variety of components configured to enable the cell phone 102 to connect, by various protocols, to numerous external networks and other functions, such as the power grid. The connectivity block 230 in one embodiment comprises a micro USB port (used for, among other things, recharging the battery and synchronizing or transferring data to and from the user's computer 108), a slot for removable storage of data, such as a MicroSD slot, a controller to manage the USB port and the storage slot, a Bluetooth™ transceiver, a GPS receiver, a Wi-Fi™ transceiver, one or more Wi-Fi™ power amplifiers, and a radio frequency identification (RFID) transceiver. The Wi-Fi™ power amplifiers and the RFID transceiver are coupled to one or more antennas 231.

A storage block 232, coupled to the processor 220, in one embodiment comprises one or more components including dynamic random access memory.

A quiet mode controller 234 is also coupled to the processor 220. The quiet mode controller 234 provides the functional capability to allow a user to designate specific dates and times as "quiet times." When so designated, the quiet mode controller 234 will automatically change the notification mode of operation of the cell phone 102 to a quiet mode of operation. The quiet mode controller 234 also provides the functional capability for the user to define or customize the actions the cell phone 102 will automatically take when the cell phone 102 enters into a "quiet mode" of operation. For example, the user may desire to have the cell phone completely silenced while operating in quiet mode. Alternatively, the user may desire to be notified by vibration when events occur. Additionally, the user might want to be notified only when certain types of events only. For example, if a baby sitter calls, the user might want to be notified.

In one embodiment, while operating in quiet mode, the wireless handset is disabled from receiving an incoming call. The wireless handset may still receive an incoming emergency call. The wireless handset may also be enabled to redirect the incoming emergency call to a public safety answering point (PSAP) by way of a cellular telecommunication network.

In one embodiment, a navigation module 236 is coupled to the processor 220. The navigation module comprises a variety of components configured to enable the cell phone 102 to determine and to display its present geographical location by communicating with a one or more location determination networks, such as, for example, a global navigation satellite system like the NAVSTAR Global Positioning System (GPS). Another example of a location determination network includes the use of location designator stations or radio frequency identification (RFID) technology to designate a specific location as a quiet zone by positioning the location designator stations or RFID tags at all portals of a specific location. Yet another example of a location determination network is a location-based transmission system that emits a "quiet zone" notification signal throughout the physical footprint of the quiet zone location, up to the location's perimeter. The navigation module 236 is coupled to one or more antennas 238 configured to receive location-specific information. In some instances, the antennas are also configured to transmit signals.

In one embodiment, a calendar feature is employed by the user of the cell phone 102 to designate quiet times of operation. For example, a student might designate weekdays between the hours of 8:00 am and noon and between 1:00 pm and 3:30 as quiet times, so as to automatically silence the student's cell phone 102 during regularly scheduled class times.

In another embodiment, the quiet mode controller 234 provides the functional capability to allow a physical location to identify itself as a "quiet location" or a "quiet zone." The cell phone 102 is configured to receive a signal, such as, for example, an RFID signal, that notifies the cell phone 102 that it has physically entered into a "quiet zone." When the cell phone 102 receives the quiet zone notification, the quiet mode controller 234 automatically changes the notification mode of operation of the cell phone 102 to a quiet mode of operation. For example, an auditorium might begin to transmit a quiet zone signal shortly before the beginning of a performance, and continue transmitting the signal until after the performance is over.

In another embodiment, the cell phone 102 is configured to identify the cell phone's 102 physical location by use of a global navigation satellite system like the NAVSTAR Global Positioning System (GPS) or by use of method of triangulation of cell towers to determine the cell phone's 102 geographical location. In this embodiment, the quiet mode controller 234 is configured to recognize specific locations (metes and bounds) that are designated as quiet zones, and when the cell phone is physically within such a designated location it will automatically switch into a quiet mode of operation.

In one embodiment, the quiet mode controller 234 configures a quiet mode of operation whereby the audible notification feature of the cell phone 102 is fully disabled. In another embodiment, the quiet mode controller 234 configures a quiet mode of operation whereby the volume of the audible notification feature of the cell phone 102 is set to a low level. In another embodiment, the quiet mode controller 234 configures a quiet mode of operation whereby the notification feature of the cell phone 102 is set to a visual-only mode. In another embodiment, the quiet mode controller 234 configures a quiet mode of operation whereby the notification feature of the cell phone 102 is set to vibrate. In another embodiment, the quiet mode controller 234 configures a quiet mode of operation whereby the cell phone is powered down at the beginning of the scheduled quiet time period; once the scheduled quiet time period is ended, the cell phone 102 automatically powers itself up and resumes standard operation. In another embodiment, the user of the cell phone 102 can personally configure the quiet mode of operation.

Another embodiment provides more flexibility in the programming of the quiet mode of operation. In some cases, the user might want the cell phone 102 to automatically power down. For example, when the user is scheduled to fly on an airplane, the user might set the scheduled flight time as a quiet time that powers off the cell phone 102 completely, and powers it up once the scheduled flight time is over. In other situations, the user will prefer to simply disable the audible notification feature of the cell phone 102. One such situation might be when the user is scheduled to attend a meeting that should not be interrupted. In other circumstances, the user might wish to allow only a certain caller, such as an administrative assistant or a baby sitter, to interrupt, but no others. In such a case, the user may configure the quiet mode controller 234 to allow an audible notification for an allowed caller.

In another embodiment, the quiet mode controller 234 may be configured to identify a plurality of quiet mode conditions to permit the user to quickly set the desired conditions for various scheduled or location-based events the user might encounter. For example, the quiet mode controller 234 may be configured to recognize an airplane quiet mode profile, a meeting quiet mode profile, a night time quiet mode profile, a concert quiet mode profile, a religious services quiet mode, a hospital quiet mode profile, a moving car quiet mode profile, etc. Each profile may be custom tailored by the user of the cell phone 102 to take the appropriate action based on the circumstances.

Other such conditions may be location-based. For example, the quiet mode controller 234 may be configured to recognize that the cell phone 102 is physically located on an airplane when the cabin doors have been closed, in an auditorium while a concert or play is being performed, in a hospital or other medical facility where there is potential for a cell phone 102 to interfere with life-supporting medical equipment, or in close proximity of the driver's seat of an automobile whose engine is running and whose transmission is not in "park."

In another embodiment, a signal is transmitted at all entrances and exits of a particular location. The cell phone 102 is configured to receive and recognize the signal as an indication that the cell phone 102 is either entering into or exiting out of a quiet zone, upon which the quiet mode controller 234 will automatically configure the cell phone 102 to operate in the quiet mode (upon entering the quiet zone) or to operate in normal mode (upon exiting the quiet zone).

One skilled in the art will readily appreciate that the illustrated arrangement of the components in FIG. 2 comprises a logical allocation of functions; thus the blocks and components illustrated and described herein can be combined or further separated in an actual implementation, and the components can be connected in a variety of ways without changing the basic operation of the cell phone 102.

Figure 3:
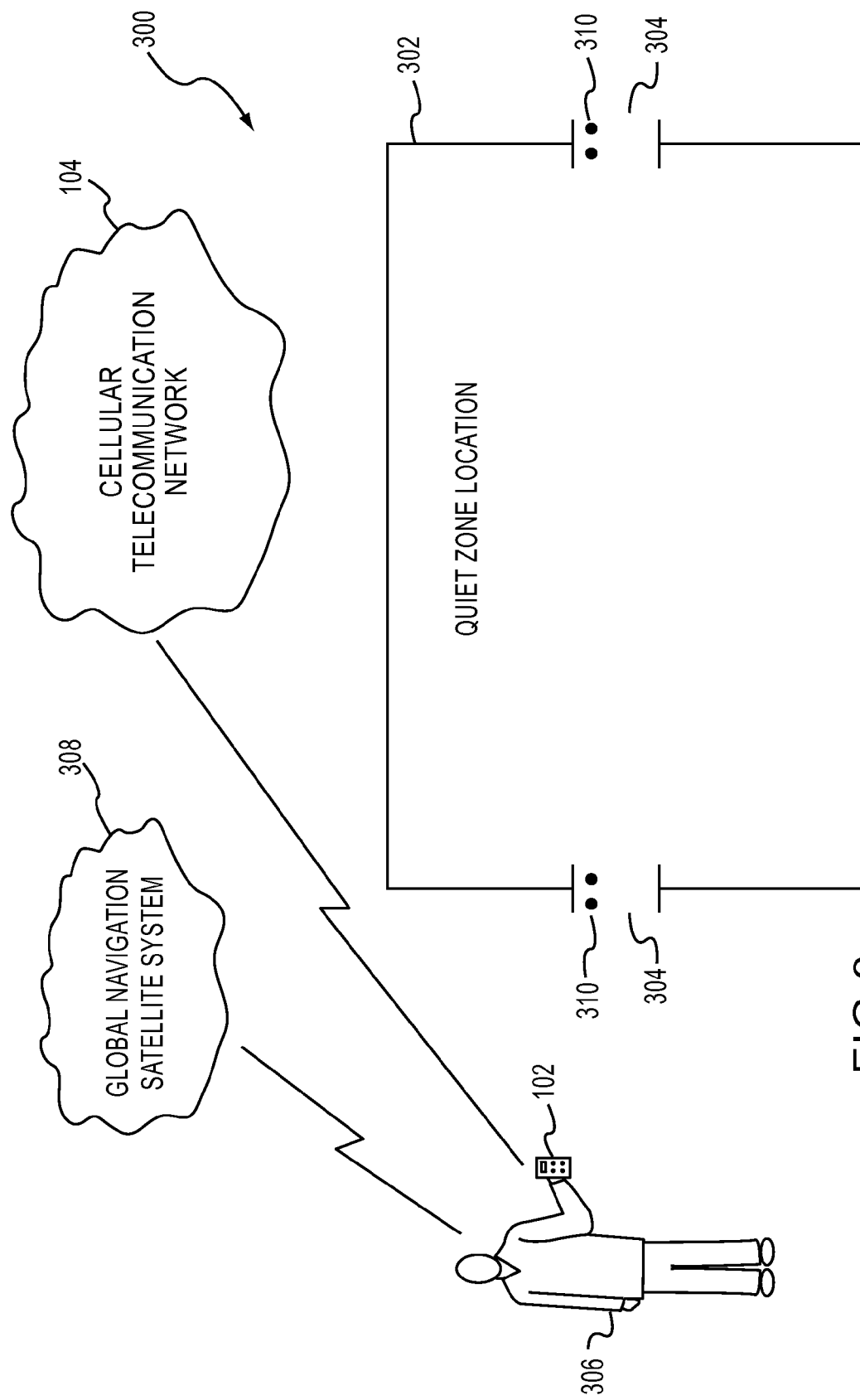
FIG. 3 is an architectural diagram illustrating the functional operation of a location determination network used in conjunction with various aspects of the inventions described herein.

Referring to FIG. 3, an architectural diagram illustrating the functional operation of a location determination network 300 is shown. A quiet zone location 302 is demarked by physical boundaries in three-dimensional space. The quiet zone location 302 comprises a plurality of portals 304 through which people may enter and exit the quiet zone location 302. For purposes of simplification only, the boundaries of the quiet zone location 302 are regular and illustrated in two dimensions; however one skilled in the art will appreciate that the boundaries of any physical location in three-dimensional space may be designated a quiet zone location 302.

A cell phone user 306 physically possesses a cell phone 102 that is configured to automatically switch into a quite mode of operating when the cell phone 102 detects that it is within the physical confines of a quiet zone location.

In one embodiment of the location determination network 300, a global navigation satellite system 308, such as NAVSTAR GPS, communicates with the cell phone 102 to identify the geographical coordinates of the cell phone 102. The proprietor of the quiet zone location 302 is permitted to identify the quiet zone location 302 (for example, a concert hall) as a quiet zone. The cell phone will then receive notification, or alternatively, determine based on its geographical coordinates, that it is located in the quiet zone location 302 directly by the signal the cell phone 102 receives from global navigation satellite system 308 as an additional piece of information that is transmitted to the cell phone 102 when the cell phone enters or exits a quiet zone location 302.

In another embodiment, the cellular telecommunication network 104 provides the geographical coordinates of the cell phone 102 at any given time, based on, for example, a method of triangulation between known fixed locations (such as cellular transmission towers) and the variable location of the cell phone 102.

In another embodiment, the proprietor of the quiet zone location 302 registers the quiet zone location 302 with the operator of the global navigation satellite system 308, whereby notice that the cell phone 102 has entered into the quiet zone location 302 is provided to the cell phone 102 from the global navigation satellite system 308.

In another embodiment, the proprietor of the quiet zone location 302 registers the quiet zone location 302 with the operator of the cellular telecommunication network 104, whereby notice that the cell phone 102 has entered into the quiet zone location 302 is provided to the cell phone 102 from the cellular telecommunication network 104.

In another embodiment, the status of the quiet zone location 302 may change depending on circumstances. For example, the proprietor of a concert hall may elect to designate the concert hall as a quiet zone location 302 only when a performance is occurring. Similarly, a church might choose to designate its sanctuary as a quiet zone location 302 only during the time that services take place.

In another embodiment, the quiet zone location 302 transmits a signal in its premises to indicate to the cell phone 102 that it is within the confines of a quiet zone location 302. In one embodiment, each portal is configured with a location notification device 310 that transmits a close range radio frequency (RF) signal that the cell phone 102 is configured to receive.

In another embodiment, the RF signal is configured to indicate whether the cell phone 102 is moving into the quiet zone location 302 thereby automatically switching the cell phone 102 to operate in a quiet mode, or whether the cell phone is moving out of the quiet zone location 302 thereby automatically switching the cell phone 102 to operate in a normal notification mode.

Figure 4:
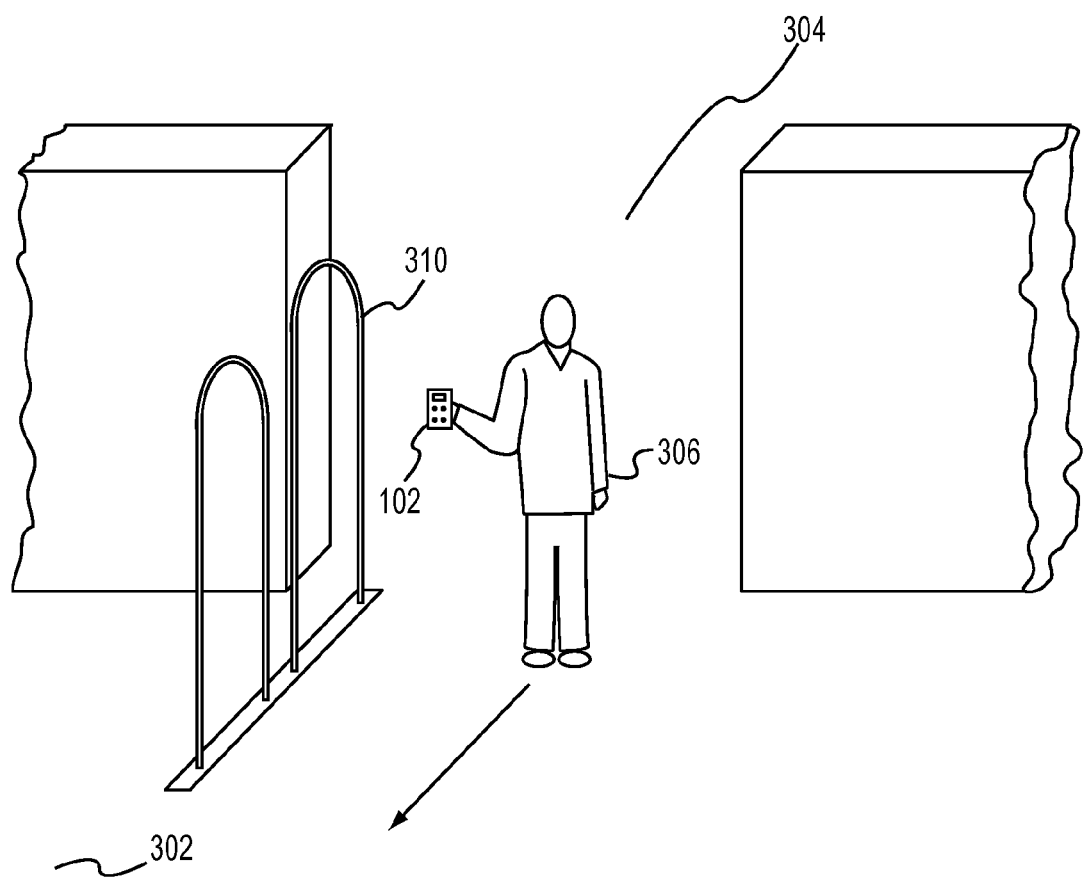
FIG. 4 is an architectural diagram illustrating a location notification device that transmits a quiet zone signal that a cell phone is configured to receive.

Referring to FIG. 4, an architectural diagram illustrating the functional operation of an embodiment of the location notification device 310 is shown. The cell phone user 306, holding the cell phone 102 is physically entering into the quiet zone location 302 through the portal 304. Positioned on the inside boundary of the quiet zone location 302 is the location notification device 310.

In one embodiment, the location notification device 310 comprises an antenna for transmitting electromagnetic energy for signaling to the cell phone 102 that it is entering a quiet zone location 302.

In another embodiment the location notification device 310 is configured to detect the direction of motion of the cell phone 102 a it passes the location notification device 310, thereby indicating whether the cell phone 102 is entering or exiting the quiet zone location 302.

In another embodiment, the cell phone 102 is able to detect whether it is entering into, or exiting out of the quiet zone location 302.

In another embodiment, the location notification device 310 comprises a centrally located transmitter or base station (not shown) that emits a quiet zone location signal throughout the entire confines of the quiet zone location 302. Accordingly, so long as the cell phone is located within the confines of the quiet zone location 302, the cell phone 102 continues to operate in the quiet mode.

In another embodiment, the location notification device 310 is configured to transmit a quiet zone notification signal throughout the entire perimeter of the quiet zone location 302.

Figure 5:
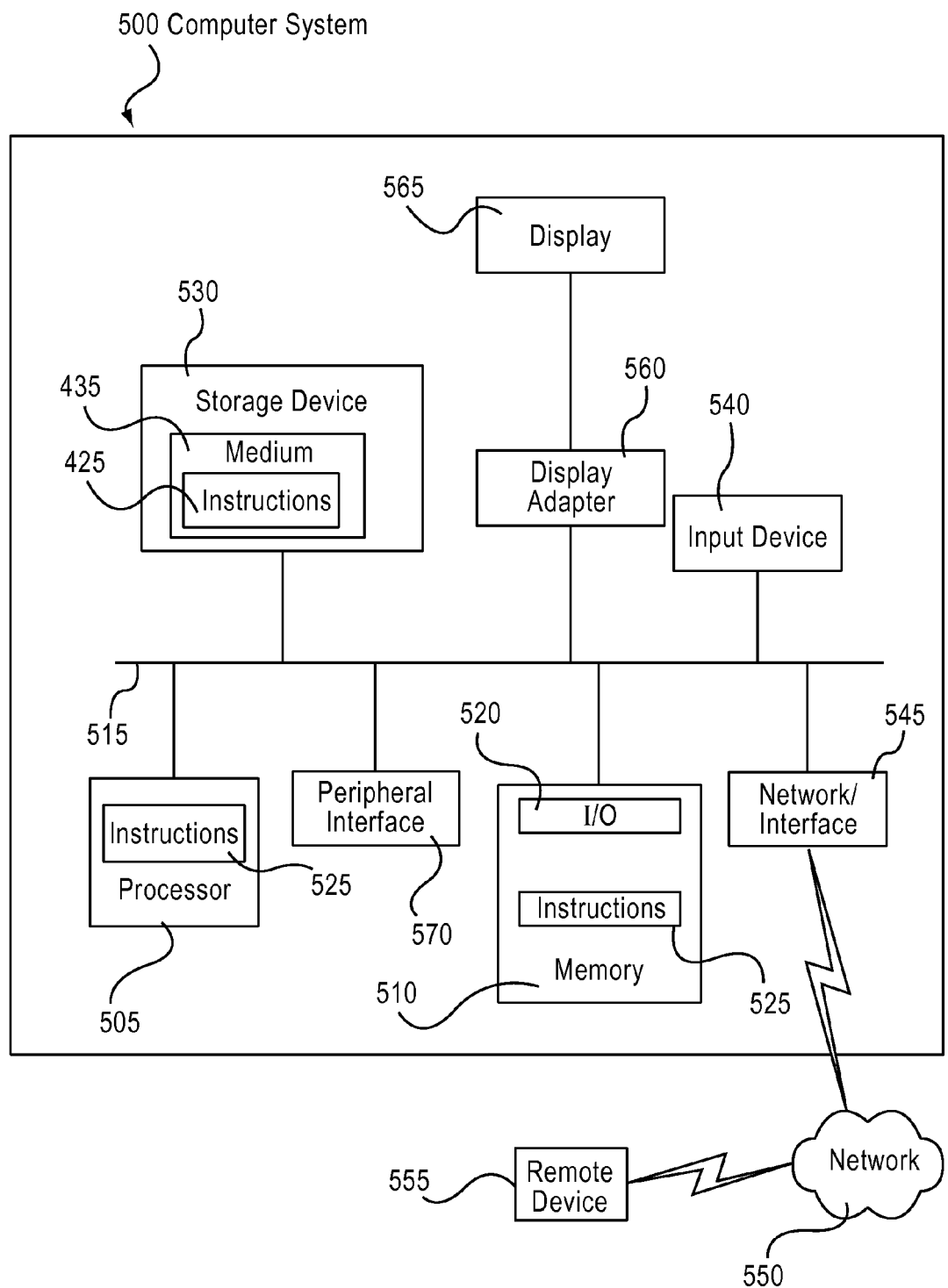
FIG. 5 is one specific example of an architecture diagram for a computer system used in conjunction with various aspects of the inventions described herein.

FIG. 5 shows a diagrammatic representation of one embodiment of a machine in the exemplary form of a computer system 500 within which a set of instructions for causing a device as disclosed herein to perform any one or more of the aspects and/or methodologies of the present disclosure. Computer system 500 includes a processor 505 and a memory 510 that communicate with each other, and with other components, via a bus 515. Bus 515 may include any of several types of bus structures including, but not limited to, a memory bus, a memory controller, a peripheral bus, a local bus, and any combinations thereof, using any of a variety of bus architectures.

Memory 510 may include various components (e.g., machine readable media) including, but not limited to, a random access memory component (e.g., a static RAM "SRAM", a dynamic RAM "DRAM, etc.), a read only component, and any combinations thereof. In one example, a basic input/output system 520 (BIOS), including basic routines that help to transfer information between elements within computer system 500, such as during start-up, may be stored in memory 510. Memory 510 may also include (e.g., stored on one or more machine-readable media) instructions (e.g., software) 525 embodying any one or more of the aspects and/or methodologies of the present disclosure. In another example, memory 510 may further include any number of program modules including, but not limited to, an operating system, one or more application programs, other program modules, program data, and any combinations thereof.

Computer system 500 may also include a storage device 530. Examples of a storage device (e.g., storage device 530) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 530 may be connected to bus 515 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 530 may be removably interfaced with computer system 400 (e.g., via an external port connector (not shown)). Particularly, storage device 530 and an associated machine-readable medium 535 may provide nonvolatile and/or volatile storage of machine-readable instructions, data structures, program modules, and/or other data for computer system 500. In one example, software 525 may reside, completely or partially, within machine-readable medium 535. In another example, software 525 may reside, completely or partially, within processor 505. Computer system 500 may also include an input device 540. In one example, a user of computer system 500 may enter commands and/or other information into computer system 500 via input device 540. Examples of an input device 540 include, but are not limited to, an alpha-numeric input device (e.g., a keyboard), a pointing device, a joystick, a game-pad, an audio input device (e.g., a microphone, a voice response system, etc.), a cursor control device (e.g., a mouse), a touch-pad, an optical scanner, a video capture device (e.g., a still camera, a video camera), touch-screen, and any combinations thereof. Input device 540 may be interfaced to bus 515 via any of a variety of interfaces (not shown) including, but not limited to, a serial interface, a parallel interface, a game port, a USB interface, a FIREWIRE interface, a direct interface to bus 515, and any combinations thereof.

A user may also input commands and/or other information to computer system 500 via storage device 530 (e.g., a removable disk drive, a flash drive, etc.) and/or a network interface device 545. A network interface device, such as network interface device 545 may be utilized for connecting computer system 500 to one or more of a variety of networks, such as network 550, and one or more remote devices 555 connected thereto. Examples of a network interface device include, but are not limited to, a network interface card, a modem, and any combination thereof. Examples of a network or network segment include, but are not limited to, a wide area network (e.g., the Internet, an enterprise network), a local area network (e.g., a network associated with an office, a building, a campus or other relatively small geographic space), a telephone network, a direct connection between two computing devices, and any combinations thereof. A network, such as network 550, may employ a wired and/or a wireless mode of communication. In general, any network topology may be used. Information (e.g., data, software 525, etc.) may be communicated to and/or from computer system 500 via network interface device 545.

Computer system 500 may further include a video display adapter 560 for communicating a displayable image to a display device, such as display device 565. A display device may be utilized to display any number and/or variety of indicators related to pollution impact and/or pollution offset attributable to a consumer, as discussed above. Examples of a display device include, but are not limited to, a liquid crystal display (LCD), a cathode ray tube (CRT), a plasma display, and any combinations thereof. In addition to a display device, a computer system 500 may include one or more other peripheral output devices including, but not limited to, an audio speaker, a printer, and any combinations thereof. Such peripheral output devices may be connected to bus 515 via a peripheral interface 570. Examples of a peripheral interface include, but are not limited to, a serial port, a USB connection, a FIREWIRE connection, a parallel connection, and any combinations thereof. In one example an audio device may provide audio related to data of computer system 500 (e.g., data representing an indicator related to pollution impact and/or pollution offset attributable to a consumer).

A digitizer (not shown) and an accompanying stylus, if needed, may be included in order to digitally capture freehand input. A pen digitizer may be separately configured or coextensive with a display area of display device 565. Accordingly, a digitizer may be integrated with display device 565, or may exist as a separate device overlaying or otherwise appended to display device 565.

Figure 6:
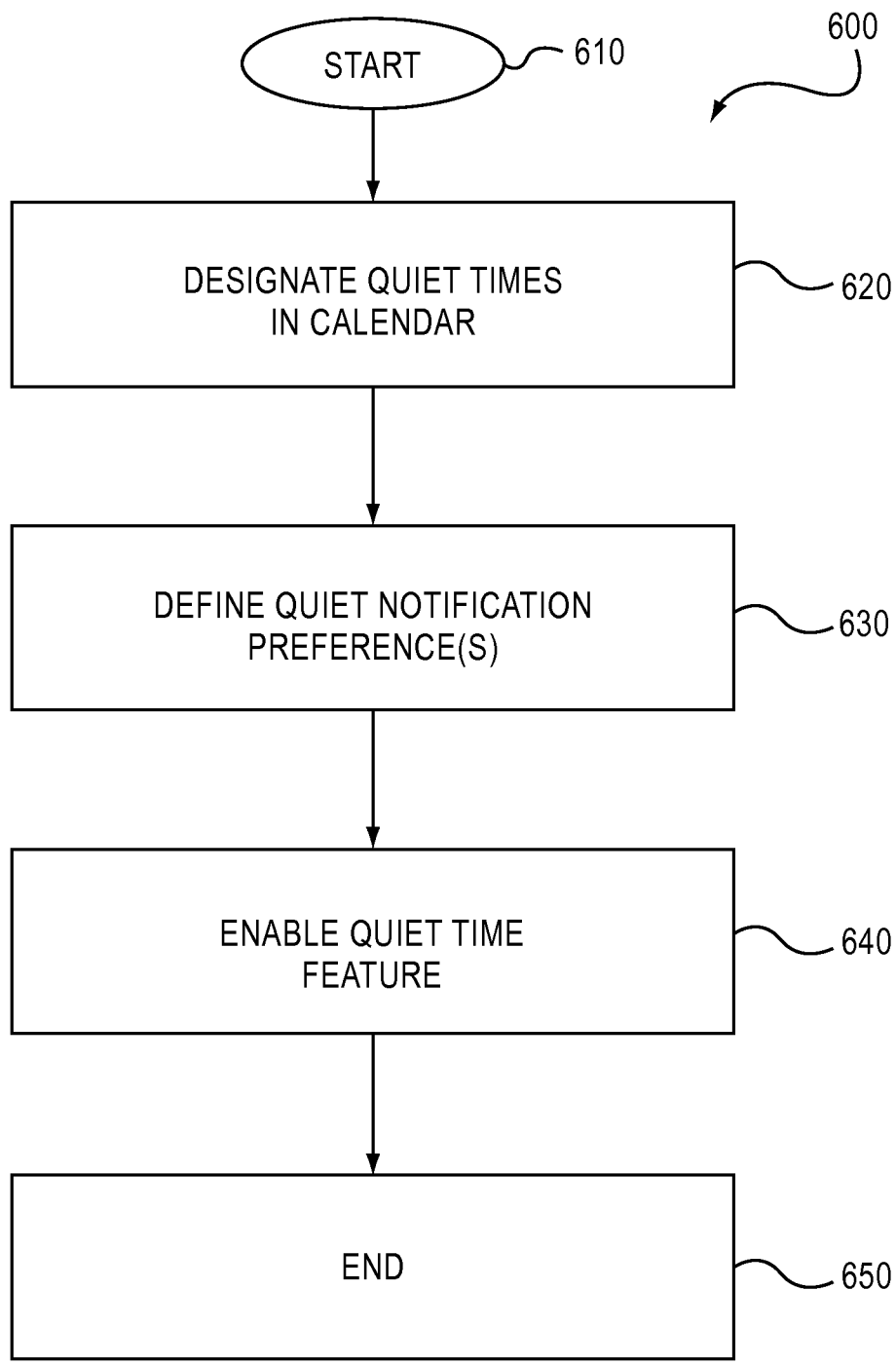
FIG. 6 is a flow chart illustrating a method of automatically switching to a quiet mode of operation of a wireless headset.

Referring to FIG. 6, a flow chart 600 illustrates a method for practicing the disclosed wireless telecommunication silencing system according to one embodiment. The method begins at block 610 where the owner or manager of a particular location, such as a movie theatre, initiates the process of designating that location as a quiet zone. Next, at block 620, the owner or manager of the location designates that location as a quiet zone by installing a quiet zone transmitter. At block 630 the quiet zone transmits a quiet zone signal to define physical boundaries of the quiet zone's physical location. At block 640, the user of the wireless handset defines one or more actions to be taken by the quiet mode controller 234 of the wireless handset when a quiet zone signal is received. At block 650, the user of the wireless handset enables the quiet mode feature to operate, thereby ensuring that the desired change in operational mode will occur at the designated quiet zones. Finally, at block 660, the user exits the quiet mode feature.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A wireless telecommunication system adapted to implement a quiet mode of operation, the system comprising:
    a cellular telecommunication network;
    a quiet zone signal transmitter configured to issue a quiet zone signal receivable in a physical environment of a quiet zone;
    a wireless handset configured to transmit voice and data information to, and configured to receive voice and data information from, the cellular telecommunication network, the wireless handset also configured to receive the quiet zone signal when the wireless handset is located within the physical environment of the quiet zone;
    wherein the wireless handset comprises a quiet mode controller configured to set the wireless handset to operate in a quiet mode when the wireless handset receives a quiet zone signal indicating that the wireless handset is moving into the quiet zone physical environment, and configured to set the wireless handset to operate in a normal mode when the wireless handset receives a quiet zone signal indicating that the wireless handset is moving out of the quiet zone physical environment;
    wherein the quiet mode is different from the normal mode;
    wherein the quiet mode comprises a disablement of the wireless handset from receiving incoming calls;
    wherein the treatment of an incoming call to a user of the wireless handset during the quiet mode is defined by the user of the wireless handset and is based at least in part on an identification of an incoming call;
    wherein the wireless handset is configured to generate an audible alert, if the incoming call received during the quiet mode is identified as a caller who has been allowed by the user of the wireless handset; and
    wherein the wireless handset is configured to redirect the incoming call received during the quiet mode to a public safety answering point (PSAP) by way of the cellular telecommunication network, if the incoming call is identified as an emergency call.

2. The wireless telecommunication system of claim 1 wherein the wireless handset is configurable to selectively issue an audible notification upon the occurrence of one or more of a plurality of events.

3. The wireless telecommunication system of claim 2 wherein the one or more of a plurality of events upon the occurrence of which the wireless handset is configurable to issue an audible notification, is selected from the group consisting of:
    a phone call;
    a voice mail message;
    an e-mail message;
    a short message service (SMS) message;
    a received real-time text-based communication;
    a messaging (IM) communication;
    a scheduled event;
    establishment of a connection with the cellular telecommunication network;
    loss of connection with the cellular telecommunication network;
    a past-due notice of a scheduled event;
    a low-power notice; and
    a reminder notification.

4. The wireless telecommunication system of claim 1 wherein the quiet zone signal transmitter comprises a radio frequency identification (RFID) transceiver.

5. The wireless telecommunication system of claim 1 wherein the quiet zone signal transmitter comprises a portal tower.

6. The wireless telecommunication system of claim 1 wherein the quiet zone signal transmitter is capable of transmitting information which comprises a description of a plurality of metes and bounds of the quiet zone location.

7. The wireless telecommunication system of claim 1 wherein the quiet zone signal transmitter is capable of transmitting information which comprises a description of the global positioning system (GPS) coordinates of the quiet zone location.

8. The wireless telecommunication system of claim 1 wherein the quiet zone signal transmitter comprises a base station positioned centrally within the quiet zone, the base station configured to transmit the quiet zone signal.

9. The wireless telecommunication system of claim 8 wherein the base station transmits a radio frequency quiet zone signal.

10. The wireless telecommunication system of claim 8 wherein the base station transmits a ultra high frequency quiet zone signal.

11. The wireless telecommunication system of claim 8 wherein the base station transmits a quiet zone signal selected from the group consisting of a visible light signal, a non-visible light signal, and an LED light signal.

12. The wireless telecommunication system of claim 2 wherein the quiet mode controller is further configured to enable the wireless handset to issue the audible notification when the wireless handset is not receiving a quiet zone signal.

13. The wireless telecommunication system of claim 1 wherein the quiet mode comprises a silent notification mode.

14. The wireless telecommunication system of claim 1 wherein the quiet mode comprises a visual-only notification mode.

15. The wireless telecommunication system of claim 1 wherein the quiet mode comprises a disablement of the wireless handset from initiating outgoing calls.

16. The wireless telecommunication system of claim 15 wherein the quiet mode further comprises an enablement of the wireless handset to initiate outgoing emergency calls.

17. The wireless telecommunication system of claim 16 wherein the quiet mode further comprises an enablement of the wireless handset to direct the outgoing emergency call to a public safety answering point (PSAP) by way of the cellular telecommunication network.

18. The wireless telecommunication system of claim 1 wherein the quiet zone signal transmitter is further configured to transmit the quiet zone signal when the wireless handset is within a predefined distance of a steering wheel of a motor vehicle, and when the motor vehicle is in an operational mode.

19. The wireless telecommunication system of claim 18 wherein the quiet mode further comprises:
   a disablement of the wireless handset from initiating outgoing calls.

20. The wireless telecommunication system of claim 1 wherein the wireless handset further comprises an override capability that permits a user of the wireless handset to override the quiet mode of operation.

21. The wireless telecommunication system of claim 1 wherein the quiet zone signal transmitter is capable of transmitting information which comprises a description of a plurality of metes and bounds of the quiet zone location, and wherein the plurality of metes and bounds are defined based on a combination of location information transmitted from a cellular network and location information transmitted from a global positioning system.

22. A computer-implemented method for automatically adjusting an operational mode of a wireless handset, the method comprising:
   designating a quiet zone having a physical location in three-dimensional space;
   transmitting a quiet zone signal to demark the quiet zone;
   setting the wireless handset to operate in a quiet mode when the wireless handset receives a quiet zone signal indicating that the wireless handset is moving into the quiet zone physical location, and setting the wireless handset to operate in a normal mode when the wireless handset receives a quiet zone signal indicating that the wireless handset is moving out of the quiet zone physical location, wherein the quiet mode is different from the normal mode, wherein the quiet mode comprises a disablement of the wireless handset from receiving incoming calls;
   by a user of the wireless handset, a quiet mode for a quiet mode controller of the wireless handset to automatically initiate when the wireless handset receives the transmitted quiet zone signal, wherein the treatment of an incoming call to the user of the wireless handset during the quiet mode is defined by the user of the wireless handset and is based at least in part on an identification of an incoming call;
   generating an audible alert, if the incoming call received during the quiet mode is identified as a caller who has been allowed by the user of the wireless handset; and
   redirecting the incoming call received during the quiet mode to a public safety answering point (PSAP) by way of a cellular telecommunication network, if the incoming call is identified as an emergency call.

23. The method of claim 22 wherein defining an action for the wireless handset to automatically initiate when the wireless handset receives the transmitted quiet zone signal further comprises defining an action for the wireless handset to automatically initiate when the wireless handset no longer receives the transmitted quiet zone signal.

* * * * *